United States Patent [19]  [11] 4,314,957
Ozawa  [45] Feb. 9, 1982

[54] METHOD FOR MANUFACTURE OF POLYMER-IMPREGNATED HOLLOW CONCRETE PRODUCT

[75] Inventor: Seiichi Ozawa, Tokyo, Japan

[73] Assignee: Ozawa Concrete Industry Co., Ltd., Tokyo, Japan

[21] Appl. No.: 149,161

[22] Filed: May 14, 1980

[30] Foreign Application Priority Data

May 19, 1979 [JP] Japan ................................. 54/61012
Nov. 29, 1979 [JP] Japan ................................. 54/153582

[51] Int. Cl.³ ...................... B28B 21/20; B28B 21/94; B28B 21/36
[52] U.S. Cl. ................................... 264/102; 264/236; 264/314; 264/333; 425/389; 425/405 R; 425/417; 425/DIG. 14
[58] Field of Search ............... 264/102, 129, 236, 314, 264/333; 425/389, 393, 417, 420, DIG. 14, 405

[56] References Cited

U.S. PATENT DOCUMENTS

| | | | |
|---|---|---|---|
| 1,965,646 | 7/1934 | Ihrig | 264/101 X |
| 2,483,175 | 9/1949 | Billner | 264/101 |
| 2,850,786 | 9/1958 | Dubbs | 264/101 |
| 3,655,847 | 4/1972 | Morgan | 264/101 X |
| 3,763,542 | 10/1973 | Gutnajer | 264/102 X |
| 3,972,969 | 8/1976 | Rio et al. | 264/101 X |
| 4,013,809 | 3/1977 | Marocco | 264/102 X |
| 4,060,953 | 12/1977 | Milne | 264/102 X |
| 4,086,309 | 4/1978 | Alberts | 264/101 X |
| 4,092,393 | 5/1978 | Marocco | 264/102 |

FOREIGN PATENT DOCUMENTS

| | | |
|---|---|---|
| 440267 | 5/1970 | Australia . |
| 469756 | 7/1973 | Australia . |
| 1173380 | 7/1964 | Fed. Rep. of Germany . |
| 2816576 | 1/1979 | Fed. Rep. of Germany . |
| 1036353 | 9/1953 | France . |
| 49-29287 | 8/1974 | Japan ................................. 264/102 |
| 50-33501 | 10/1975 | Japan ................................. 264/129 |
| 50-33688 | 11/1975 | Japan ................................. 264/129 |

Primary Examiner—Philip Anderson
Attorney, Agent, or Firm—Kurt Kelman

[57] ABSTRACT

A polymer-impregnated concrete product is obtained by placing a concrete mix in a frame capable of withstanding high temperature and high pressure in such a manner as to form therein a hollow portion, molding the concrete mix to obtain a concrete article containing a hollow portion therein, causing the concrete article as held in a tightly closed state in the frame to be cured by application of heat, subjecting the concrete article, as retained in the frame, to treatments for drying and de-aeration, then supplying a monomer preparation to the hollow portion of the concrete article, applying pressure to bear upon the concrete article thereby causing the monomer preparation to be diffused into the fine voids in the concrete article, and heating the concrete article in situ thereby allowing the diffused monomer to be polymerized.

4 Claims, 4 Drawing Figures

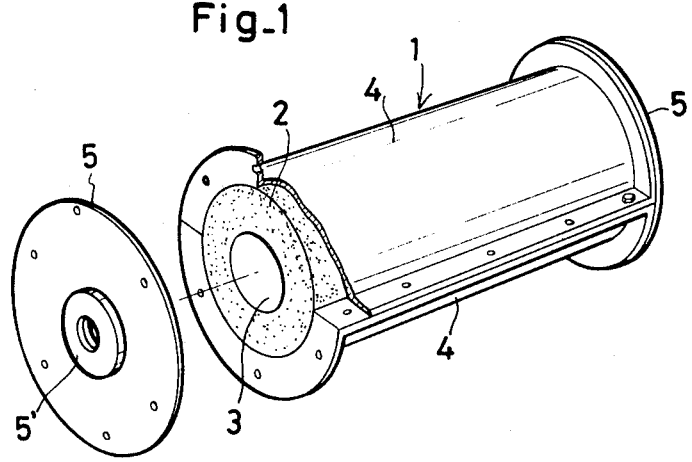
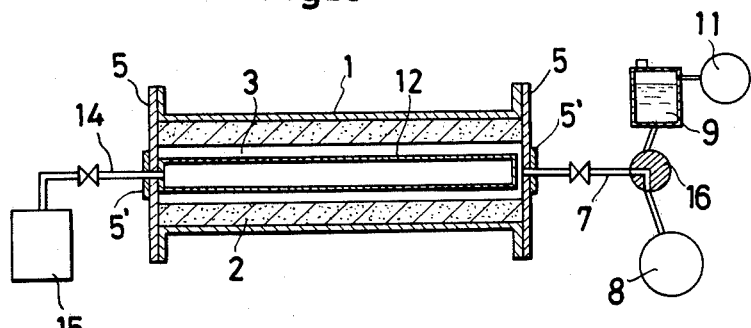
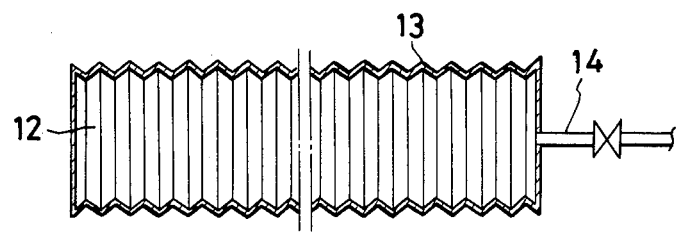

METHOD FOR MANUFACTURE OF POLYMER-IMPREGNATED HOLLOW CONCRETE PRODUCT

BACKGROUND OF THE INVENTION

This invention relates to a method for the manufacture of polymer-impregnated hollow concrete products.

Japanese Pat. Publication No. SHO. 49(1974)-34757 and SHO 51(1976)-22493 disclose that concrete products in which the fine voids thereof have been impregnated with a monomer and this monomer has been thermally polymerized in situ enjoy improved bending strength and compressive strength and, at the same time, exhibit outstanding resistivity to freezing and thawing and to chemicals.

The conventional method for polymer impregnation, comprises the steps of drying, with hot air, molded concrete article released from its mold, deaerating it under a reduced pressure, impregnating it with a monomer under application of pressure, thermally polymerizing the monomer entrapped within the concrete article and giving a surface treatment to the concrete article.

The hot-air drying of the molded concrete article is aimed at vaporizing the moisture entrapped in fine voids of the concrete article and securing spaces for impregnation by a monomer, enhancing the adhesiveness of the concrete with the polymer and, at the same time, obtaining the polymer in a continuous phase and preventing the monomer entrapped within the fine voids from being dispersed and wasted owing to an increase in the vapor pressure within the fine voids during the thermal polymerization of the monomer.

The vacuum deaeration of the dried concrete article is aimed at accelerating the speed of the monomer impregnation of concrete article and shortening the time required for the impregnation, increasing the ratio of monomer entrapment by allowing the monomer to be amply diffused even into fine voids at great depth and, during the thermal polymerization of the monomer, preventing the entrapped monomer from being dispersed and wasted owing to the thermal expansion of air.

As the monomer for impregnating concrete products there is chiefly used methyl methacrylate or styrene. Optionally the monomer is used with a plasticizer, a crosslinking agent, a polymerization accelerator, etc. incorporated therein for the purpose of improving the quality of the concrete products. In most cases, the impregnation of the molded concrete article with the monomer is effected by a procedure comprising the steps of deaerating the concrete article and subsequently causing the deaerated concrete article to be impregnated with the monomer under application of pressure to accelerate the diffusion of the monomer into the concrete article.

The manufacture of polymer-impregnated concrete products according to the method described above necessitates use of facilities for drying molded concrete articles, tightly closed vessels for vacuum deaeration and impregnation under pressure, and facilities which, during the thermal polymerization of the entrapped monomer, permit the monomer to polymerize without being dispersed and wasted. Further, the facilities and vessels mentioned above are destined to grow both in direct size and price in proportion to the size of the concrete products to be treated.

In the known method of manufacture of polymerimpregnated hollow concrete products, the hollow molded concrete article is introduced into a monomer vessel to impregnate it with the monomer. After the hollow concrete article has been impregnated with the monomer, it is taken out of the monomer vessel. At this time, the excess monomer solution not impregnated into the concrete that remains in the hollow part of the concrete is removed from the vessel together with the article and is consequently wasted. Even if such excess monomer solution is recovered somehow or other, the recovered monomer solution frequently contains cement powder and other dust from the molded concrete. Before it is put to use again, therefore, it must be freed from such extraneous matter.

The inventor has proposed a method for the manufacture of concrete products of excellent mechanical properties, by the steps of filling a frame capable of withstanding high temperature and high pressure with a concrete mix in such a manner as to form a concrete article, then airtightly closing the frame, heating the frame while preventing leakage of water from the molded concrete article within the frame and allowing the content of the frame to cure under conditions of high temperature and high pressure (U.S. Pat. No. 4,224,274). The present invention constitutes a further development of the method described above.

SUMMARY OF THE INVENTION

A main object of this invention is to provide a method for easy and inexpensive manufacture of polymer-impregnated hollow concrete products of large sizes.

Another object of this invention is to provide a method for the manufacture of polymer-impregnated concrete products, which method enables the prescribed amount of the monomer to be effectively diffused throughout the entire volume of the concrete article while totally eliminating excess use of the monomer and, thereafter, allows the diffused monomer to be polymerized in situ.

To accomplish the objects described above according to this invention, there is provided a method for the manufacture of polymer-impregnated hollow concrete products, which comprises placing in a frame capable of withstanding high temperature and high pressure a concrete mix in such a manner as to form a hollow portion in the resultant concrete article, airtightly closing the frame, heating the frame thereby curing the molded concrete article contained therein has been cured, subjecting the cured concrete article held within the frame to forced drying, then deaerating the dried concrete article, feeding the monomer into the hollow portion of the concrete article within the frame, applying pressure to the interior of the frame until the monomer has thoroughly permeated the fine voids of the concrete and the concrete has been thoroughly impregnated with the monomer, and thereafter heating the concrete article within the frame until the monomer has been polymerized in the airtightly closed frame.

According to the method of this invention for the manufacture of polymer-impregnated concrete products, the frame which has been used to mold the concrete mix is utilized, with the molded concrete left intact therein, as an improvised vessel for drying the molded concrete article, deaerating it, impregnating it with the monomer and heating it thereby thermally polymerizing the monomer entrapped therein. Thus, this method permits even large polymer-impregnated concrete products to be manufactured easily with inexpensive equipment. Besides, since an inner frame is inserted into the hollow portion of the molded concrete in advance of the time at which the monomer is fed into the hollow portion for impregnation into the surrounding concrete, the size of the hollow portion into which the monomer is to be fed can be diminished and, consequently, the possibility of excess consumption of the monomer is curbed. In the case of an expandable inner frame, the inner frame, when expanded, increases the pressure within the frame and enables the monomer to be diffused into the molded concrete with added effectiveness.

The other objects and characteristic features of this invention will become apparent from the further disclosure of the invention to be given hereinafter with reference to the accompanying drawing.

BRIEF DESCRIPTION OF THE DRAWING

FIG. 1 is a partially cut-away perspective view of one embodiment of the frame to be used in the method of this invention for the manufacture of concrete products.

FIG. 3 is a cross section illustrating the stage for the impregnation of concrete article with the monomer in the method of this invention for the manufacture of concrete products.

FIG. 4 is a cross section of one embodiment of the inner frame capable of being varied in volume, to be used in the stage of the monomer diffusion as shown in FIG. 3.

DESCRIPTION OF THE PREFERRED EMBODIMENT

Figure 2:
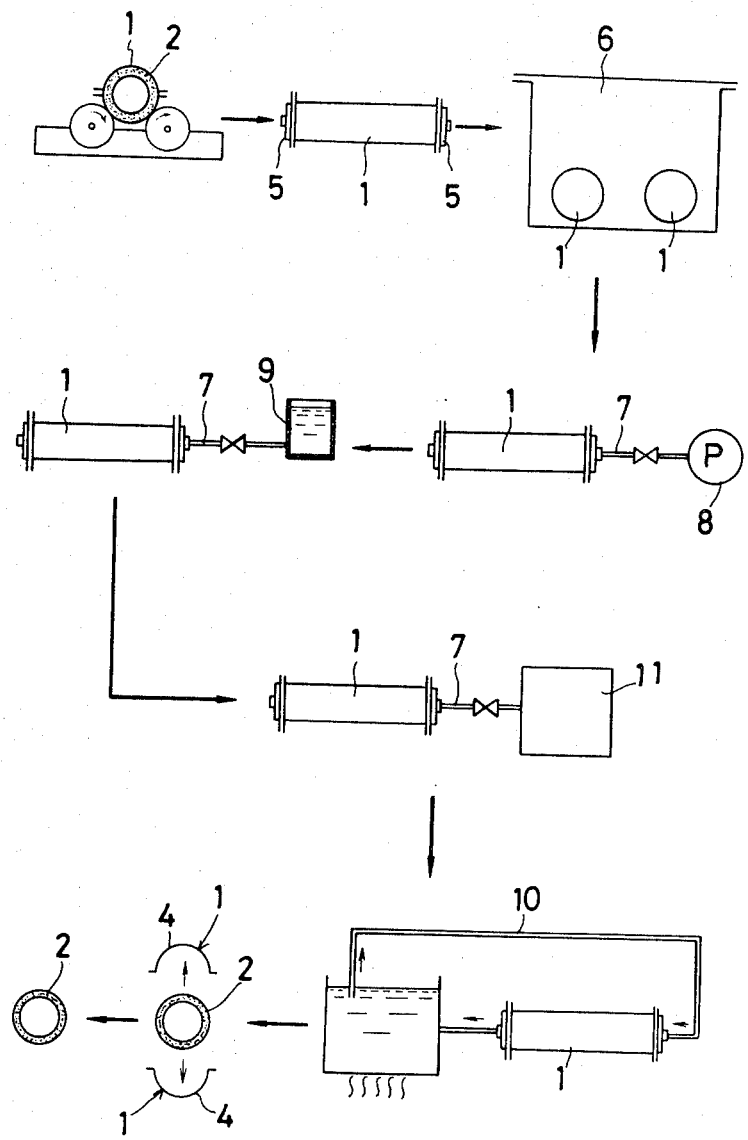
FIG. 2 is a schematic flow diagram illustrating the method of this invention.

Referring to FIGS. 1 and 2, in a frame 1 made of a material capable of withstanding high temperature and high pressure and constructed to be tightly closed, concrete mix 2 is placed so as to form a hollow portion 3 of a prescribed shape therein. In the manufacture of a concrete product of the shape of a hollow pole, the frame to be used has the shape of a long cylinder and the hollow portion to be formed therein has a circular cross section. In the manufacture of a Hume concrete pipe or a reinforced concrete pile, in a corresponding frame, required reinforcers are arranged and the concrete mix is placed so as to incorporate the reinforcers and, at the same time, give rise to a hollow portion of a prescribed shape. The concrete mix thus placed in the frame may be formulated with ingredients known to the art and the placement of this concrete mix may be performed by any of the methods known to the art.

In the illustrated embodiment, the frame 1 comprises two matching frame members 4 possessing a semicircular cross section and open ends and two lids 5 adapted to close the opposite ends of the frame members. These frame members are made of a material capable of withstanding high temperature such as of 250° C. and high pressure such as of 20 kg/cm$^2$ and adapted to produce an airtight union with the aid of a packing, for example.

After the concrete mix 2 has been placed in the frame 1 in such a manner as to produce the hollow portion 3, this frame 1 is heated with a heating device 6. When the temperature obtained by the heating with this device 6 is not more than 100° C., the frame 1 may be heated with the lids 5 kept out of the frame. When the temperature of this heating exceeds 100° C., however, the frame members 4 are tightly closed with the lids 5 before the frame 1 is heated to cure the concrete molded therein. When this heating elevates the temperature to 200° C., the absolute pressure within the tightly closed frame 1 rises to about 16 kg/cm$^2$, with the result that part of the silica and calcium in the concrete mix which would otherwise not be reacted are allowed to undergo reaction to produce a stable hydrate. The concrete product obtained consequently will enjoy notably high strength.

The aforementioned heating device 6 may operate according to any of the principles known to the art. For example, a device adapted to utilize a heated oil in which the frame 1 is to be immersed, a device adapted to effect the heating by use of heated air instead of the heated oil, a device adapted to heat the frame 1 by means of electricity or high-frequency waves, or other similar devices may be adopted.

By heating the frame 1 as described above, the molded concrete within the frame is cured. Since the frame is tightly closed as described above, the molded concrete can be cured in much the same way as is obtained by use of an autoclave. Generally, strength begins to manifest itself in the concrete after five to eight hours of the curing.

The aforementioned heating and curing of the molded concrete disposed inside the sealed mold can be effected by the method disclosed by the U.S. Pat. No. 4,224,274.

When the strength of the concrete begins to manifest itself, the heating is discontinued and the frame is partially loosened to release steam from within the frame. This release of the steam may be effected by opening the safety vent (not shown) of the frame. After the steam within the frame has been substantially released, the molded concrete article as contained in the frame is subjected to the treatment of drying. This drying treatment can be accomplished by a method which comprises heating the frame to temperatures between 150° C. and 200° C. and, at the same time, removing the lids 5 from the opposite ends of the frame members 4 to cause spontaneous drying of the molded concrete article or a forced drying method which comprises heating the frame to temperatures between 150° C. and 200° C. and, meanwhile, releasing the steam generated inside the frame into the ambience by means of a suction pump connected to the lid of the frame. This drying of the molded concrete article is closely related with the impregnation of the concrete article with the monomer which will be discussed afterward. To be specific, when the concrete article is dried thoroughly, the monomer is allowed to be diffused within the concrete to the greatest depth and the concrete product to be finally obtained enjoys high quality. In the whole process of the manufacture of a polymer-impregnated concrete product, the stage of this drying consumes the most time. Increasing the thoroughness of this concrete drying, however, raises the expense of heating the frame and lengthens the period during which the frame is involved in the heating so as to increase the overall period required for the manufacture of the concrete product. Thus, thorough drying does not prove economical. The degree to which the drying of the concrete is effected is determined by the strength which the particular concrete product is expected to offer in its intended application. Generally, for a molded concrete article 50 mm in thickness, 12 to 30 hours' drying treatment ought to suffice. After this drying treatment is completed, the frame is tightly closed once again and is then subjected to the treatment for deaeration which serves to remove air from within the frame itself and also from within the fine voids of the concrete article. In a typical deaeration treatment, desired removal of the air entrapped within the frame is accomplished by providing the lid 5 with an auxiliary lid 5', connecting to this auxiliary lid 5' a pipe 7 having one end thereof connected to a vacuum pump 8, and setting the vacuum pump 8 into operation. This deaeration treatment fulfills its purpose sufficiently when the degree of vacuum inside the frame falls below 50 mmHg. An attempt to increase this degree of vacuum fails to bring about any appreciable effect for the trouble involved.

After this deaeration treatment has been finished, the vacuum pump 8 attached to the pipe 7 is removed and connected to a monomer tank 9 and operated to forward the monomer in this tank 9 to the hollow portion 3 in the concrete article. Any of the known monomers such as styrene, methyl methacrylate and acrylonitrile which are capable of producing rigid polymers can be used herein. The monomer can be prepared to incorporate therein additives such as a polymerization initiator or a crosslinking agent, substances which are widely known to facilitate polymerization. The amount of the monomer supplied to the hollow portion is about 3 to 8% by weight based on the weight of the concrete article. If the amount is smaller, the monomer fails to fill the fine voids of the concrete effectively. If it is larger, the excess portion of the monomer is wasted with a resulting economic loss.

After the monomer has been supplied to the hollow portion as described above, pressure is applied to bear upon the concrete inside the frame so as to permit the monomer to be diffused into the fine voids of the concrete article. This application of pressure is generally accomplished by connecting a compressor 11 to the pipe 7 and operating the compressor 11 to expose the interior of the frame 1 to pressure. This impregnation of the concrete article with the monomer is economically accomplished by connecting the monomer tank 9 to the frame 1 thereby allowing the interior of the monomer tank to communicate with the interior of the frame, placing in the monomer tank 9 such amount of the monomer as is needed to effect thorough impregnation of the concrete, connecting the monomer tank 9 also to a compressor 11 thereby permitting a prescribed degree of pressure to be applied to the monomer tank interior and forcing the monomer to flow into the hollow portion of the molded concrete, and allowing the monomer in the monomer tank to be supplied to the frame interior whenever the pressure inside the frame has fallen below a stated level as the monomer diffusion in the concrete proceeds (FIG. 3).

One advantageous method whereby the impregnation of the molded concrete with the monomer is accelerated by application of pressure to the frame interior is now explained with reference to FIG. 3 and FIG. 4.

After the drying treatment has been finished on the molded concrete article 2 already cured by heat inside the frame 1, an inner frame 12 capable of being varied in volume as illustrated in FIG. 4 is inserted into the hollow portion 3 of the molded concrete article 2 and the frame is tightly closed with the lids. The inner frame 12 is a cylindrical hollow member possessed of a freely expandable bellows-like barrel 13. The hollow interior of the inner frame 12 communicates with the pipe 14. This inner frame is made of a material such as a plastic or steel material which is not corroded by the monomer.

As described above, the inner frame 12 of a size such that the barrel 13, when inflated fully, will substantially fill up the hollow portion is inserted into the hollow portion of the molded concrete. The pipe 14 is passed through the auxiliary lid 5' provided on the lid 5 and led outside and connected to the source of pressure 15. Where this pipe 14 is led out through the auxiliary lid of the lid 5, the gap formed between this pipe and the auxiliary lid is sealed such as with a packing to ensure the airtight construction of the frame.

The pipe 7 which is connected to the auxiliary lid 5' of the other lid is connected to the vacuum pump 8 and the monomer tank 9 through the medium of a switch valve 16.

After the inner frame 12 has been inserted into the hollow portion 3 of the molded concrete article 2 and the lids 5 have been closed on the frame, the pipe 7 is connected to the vacuum pump 8 by means of the switch valve 16 to extract the air from within the frame. After the degree of vacuum within the frame has reached 50 mmHg, the switch valve 16 is manipulated so that the monomer will be supplied to the hollow portion via the pipe 7. Since the frame interior has been deaerated to some extent, the monomer entering the gap between the hollow portion and the inner frame is caused to find its way into the molded concrete. After the prescribed amount of the monomer (3 to 8% by weight based on the weight of the concrete) has been supplied, the fluid from the source of pressure 15 is forwarded into the inner frame 12. Consequently, the inner frame swells out and the pressure within the frame increases. The increased inner pressure is exerted on the portion of the monomer existing in the gap between the hollow portion and the inner frame and, under the pressure, the monomer is diffused into the fine voids of the molded concrete. As the fluid to be supplied by the source of pressure 15 to the hollow portion of the inner frame, there may be used air, water or some other similar substance. On the outer portion of the molded concrete, namely the portion in contact with the inner wall of the frame 1, a slight gap occurs as the molded concrete shrinks. Because of this gap coupled with the high pressure exerted inside the frame, the monomer is allowed to enter the concrete additionally from the outer side. After the monomer has been amply diffused into the fine voids of the concrete, the inner frame is removed from the hollow portion of the concrete article and the excess monomer is discharged out of the frame. This finishes the treatment for the impregnation of the concrete article with the monomer.

The foregoing embodiment has been described as involving use of a volume-variable inner frame. Even when an inner frame of an invariable volume having a shape substantially identical with the shape of the hollow portion of the molded concrete is inserted in the hollow portion during the impregnation treatment, the gap formed inside the frame can be diminished and the monomer impregnation carried out with high efficiency.

The length of time spent for the treatment of monomer impregnation should be determined depending on the degree to which the concrete article is required to be dried, the magnitude of the pressure used to supply the monomer to the concrete article, and the thickness of the concrete article subjected to the monomer impregnation. Generally, it falls within the range of from one to three hours.

After the fine voids of the concrete article have been impregnated with the monomer, the concrete article is heated to effect polymerization of the monomer. In this case, the heating is advantageously accomplished by a method which typically comprises liquid tightly connecting a circulation pipe 10 to the frame through the medium of the auxiliary lids 5' of the lids 5 and circulating hot water through the hollow portion 3 of the concrete article in the frame 1. Of course, the heating can be accomplished by filling the hollow portion with water and directly heating the frame with an external heat source. A method of heating by use of high-frequency waves is also usable. Alternatively, this heating may be accomplished by removing the frame completely from the concrete article and thereafter immersing the bare concrete article in hot water.

The method of heating and the temperature of polymerization and the length of time for the polymerization are suitably selected depending on the shape of the frame, the kind of concrete, the kind of the monomer used for the impregnation, etc. Generally, the temperature of polymerization ought to fall within the range of from 70° to 100° C. and the length of time within the range of from three to eight hours.

When the molded concrete is heated as described above, the monomer entrapped within the fine voids of the concrete article is converted into a corresponding polymer and brought into fast union with the concrete component. Because of this polymer, therefore, the concrete product enjoys notable improvement in its compressive strength and bending strength and exhibits outstanding resistivity to freezing and thawing and to chemicals. Although the concrete product is generally put to use as removed from the frame, it may be retained in the frame and used as a composite pile.

As is clear from the foregoing description, this invention effects the manufacture of a polymer-impregnated hollow concrete product by placing in a closed frame capable of withstanding high temperature and high pressure a concrete mix in such a manner as to produce a hollow portion, heating the molded concrete article thereby curing it and, after the concrete article has been cured enough to acquire strength, subjecting the concrete article to drying and deaeration, then supplying the monomer to the hollow portion of the concrete article, exerting pressure to bear upon the frame interior thereby allowing the monomer to be diffused throughly into the fine voids of the concrete article and thereafter heating the concrete article thereby polymerizing the monomer in situ. Thus, the frame can be utilized as an improvised vessel for subjecting the concrete article held therein to the treatments of deaeration, monomer impregnation and thermal polymerization of the monomer. This method, therefore, permits polymer-impregnated concrete products of unusually large sizes to be readily manufactured with inexpensive equipment. Besides, the insertion of the expandable inner frame into the hollow portion of the concrete article prior to the supply of the monomer into this hollow portion results in a decrease in the size of the gap produced inside the hollow portion and warrants efficient diffusion of the prescribed amount of the monomer in the concrete article. In this connection, the device used for the monomer impregnation under pressure may be of a smaller size than the conventional countertype. Now, the invention will be described with reference to working examples.

EXAMPLE 1

Two concrete mixes different in composition were placed in frames having a length of 100 cm and an inside diameter of 20 cm and made of iron plates about 1.0 cm in thickness and, with the frames tightly closed, subjected to centrifugal molding to obtain concrete articles having an outside diameter of about 20 cm and a length of about 100 cm and containing a hollow portion about 10 cm in inside diameter.

TABLE 1

| Composition (wt %) | Cement | Silica | Water | Fine aggregate | Coarse aggregate | Admixture |
|---|---|---|---|---|---|---|
| A | 24 | 7 | 6.5 | 21.4 | 40.5 | 0.6 |
| B | 26.8 | 8.0 | 7.3 | 19.8 | 37.4 | 0.7 |

The concrete articles formed in the frames as contained in a tightly closed state within the frames were placed in a heating furnace and cured therein at 180° C. After six hours of the curing, safety valves provided on lids of the frames were opened to release high-pressure steam from within the frames. Then, with the lids removed from the opposite ends of the frames, the frames were heated at 200° C. for varying lengths of time, namely 6, 12, 24 and 48 hours, to evaporate and dry the concrete molds. After the stated lengths of the drying treatment, the concrete articles as kept in their respective frames were cooled. Then, cylindrical inner frames made of a steel material about 8 cm in outside diameter and about 85 cm in length were inserted one each in the hollow portions of the concrete articles and lids were applied to close tightly the opposite ends of the frames. Thereafter, the concrete articles within the frames were deaerated for 90 minutes by keeping the interiors of the frames at 1 mmHg with a pump.

After the deaeration treatment, a monomer preparation comprising 90 parts by weight of styrene, 10 parts by weight of trimethylol-propane trimethacrylate and 1 part by weight of 2,2'-azo-bis-isobutylonitrile was injected into the frames and the concrete articles in the frames were thereafter left to stand for five hours with the monomer preparation continuously supplied at a pressure of 20 kg/cm² with a hydraulic pump.

After the five hours' impregnation of the concrete articles with the monomer preparation was completed, the portion of the monomer preparation remaining in the hollow portions and the inner frames were removed. Then, hot water at 80° C. was circulated through the hollow portions of the concrete articles for five hours to polymerize the monomer entrapped within the concrete articles. The conditions of monomer diffusion in the concrete-polymer composite products and the compression strength thereof are shown in Table 2. For comparison, the compression strengths of the concrete products obtained from concrete mixes of the same compositions without involving the monomer diffusion are also shown in the Table. In the Table, the monomer diffusion thicknesses "$h_1$" and "$h_2$" respectively represent the depth to which the monomer diffused in the inward radial direction from the outer circumferential surface of the concrete article and the depth to which the monomer diffused in the outward radial direction from the inner circumferential surface defining the hollow portion and the symbol "T" represents the total of the values of "$h_1$" and "$h_2$". The aforementioned depths of monomer diffusion were determined by cutting a given sample perpendicularly to the axis, applying phenolphthalein, a substance capable of discoloring only the portion of the concrete not impregnated with the polymer.

TABLE 2

| Composition of concrete | Drying time (hr) | Depth of monomer diffusion (mm) | | | Compressive strength of of concrete product (kg/cm²) |
|---|---|---|---|---|---|
| | | $h_1$ | $h_2$ | T | |
| A | 6 | 7 | 18 | 25 | 1491 |
| | 12 | 12 | 23 | 35 | 1702 |
| | 24 | 13 | 27 | 40 | 1822 |
| | 48 | — | — | 50 | 1945 |
| | No monomer diffused | | | | 1179 |
| B | 6 | 6 | 8 | 14 | 1595 |
| | 12 | 10 | 18 | 28 | 1773 |
| | 24 | 11 | 23 | 34 | 1851 |
| | No monomer diffused | | | | 1323 |

EXAMPLE 2

By following the procedure of Example 1, concrete mixes of the composition "A" were subjected to centrifugal molding to produce concrete articles having a hollow portion. The concrete articles as held in the molds were cured by heating. Then, with the lids removed from the opposite ends of the frames, the concrete articles were dried at 200° C. for 24 hours. Subsequently, the same inner frames as used in Example 1 were inserted one each in the hollow portions of the concrete articles. With the frames tightly closed, the interiors of the frames were kept under a pressure of 1 mmHg by use of a vacuum pump for 90 minutes. The monomer preparation was caused to be diffused in the concrete articles under a pressure of 10 kg/cm² and under a pressure of 20 kg/cm², for varying lengths of time indicated in Table 3. The monomer entrapped in the concrete articles was polymerized with hot water at 80° C. by following the procedure of Example 1. The conditions of monomer diffusion in the concrete products and the compression strengths thereof are shown in Table 3.

TABLE 3

| Pressure of monomer diffusion (kg/cm²) | Time of monomer diffusion (hr) | Depth of monomer diffusion (mm) | | | Compressive strength of concrete product (kg/cm²) |
|---|---|---|---|---|---|
| | | $h_1$ | $h_2$ | T | |
| 10 | 1 | 6 | 19 | 25 | 1661 |
| | 3 | 8 | 22 | 30 | 1828 |
| | 5 | 6 | 23 | 29 | 1838 |
| 20 | 1 | 7 | 22 | 29 | 1770 |
| | 2 | 8 | 22 | 30 | 1741 |
| | 3 | 11 | 24 | 35 | 1840 |
| | 5 | 13 | 27 | 40 | 1822 |
| No monomer diffused | | | | | 1199 |

What is claimed is:

1. A method for the manufacture of a polymerimpregnated hollow concrete product, comprising the steps of (a) placing a concrete mix in a frame capable of withstanding high temperature and high pressure and shaped to form a product defining a hollow portion, (b) tightly closing the frame containing the concrete mix to mold the concrete mix into the hollow concrete product, (c) heating the tightly closed frame until the molded concrete contained therein has been cured, and, after strength has developed in the cured molded concrete, (d) drying the cured molded product and then deaerating the cured product in the frame interior, (e) supplying a monomer to the hollow portion of the deaerated concrete product within the frame, (f) applying pressure on the frame interior until the monomer has been diffused in the fine voids of the concrete product, and (g) heating the monomer entrapped in the concrete product in the frame until the monomer has been polymerized.

2. The method according to claim 1, wherein the frame interior is deaerated to about 50 mm Hg before supplying the monomer.

3. The method according to claim 1 or 2, wherein an expandable inner frame is inserted into the hollow portion of the concrete article obtained by the step (d) before the dried product has been deaerated in the frame interior, and inflating the inner frame after step (e) to apply said pressure.

4. The method according to claim 1, 2, wherein the polymerization of the monomer is effected by circulating hot water through the hollow portion of the concrete product impregnated with the monomer.

* * * * *